May 5, 1964   H. D. VAN SCIVER II, ET AL   3,131,726
HELICALLY-FORMED SANDWICH TUBING
Filed Jan. 24, 1961   2 Sheets-Sheet 1

INVENTORS.
Herbert D. Van Sciver, II
John J. MacKinney
Richard P. Hurlebaus.
BY
Thomas S. Dayton
ATTORNEY May 5, 1964  H. D. VAN SCIVER II, ET AL  3,131,726
HELICALLY-FORMED SANDWICH TUBING
Filed Jan. 24, 1961
2 Sheets-Sheet 2

INVENTORS
Herbert D. Van Sciver II
John J. MacKinney
BY Richard P. Hurlebaus
ATTORNEY

United States Patent Office 3,131,726
Patented May 5, 1964

3,131,726
HELICALLY-FORMED SANDWICH TUBING
Herbert D. Van Sciver II, Merion Station, John J. Mac-Kinney, Narberth, and Richard P. Hurlebaus, Huntingdon Valley, Pa., assignors to The Budd Company, Philadelphia, Pa., a corporation of Pennsylvania
Filed Jan. 24, 1961, Ser. No. 84,639
3 Claims. (Cl. 138—142)

This invention pertains to helically-formed sandwich tubing, particularly for applications prescribing minimum weight and maximum dimensional stability.

Sandwich tubing made according to this invention is particularly adapted for nuclear engineering applications where maximum dimensional stability tubing of minimum areal density—minimum mass of tubing material per unit surface area—is required. Minimum areal density results in minimum radiation absorption and least radiation affect upon, or by, the tubing.

While helically-formed sandwich tubing has been proposed heretofore, it has not been economically feasible without compromise of optimum structural properties.

Therefore, it is a general object of this invention to provide a relatively inexpensive, low areal density, sandwich tubing having maximum dimensional stability.

A specific object is to provide helically-formed sandwich tubing having inner and outer skins and an improved core means for spacing and stabilizing the skins.

According to this invention, helically-formed sandwich tubing comprises an inner sheet metal skelp helically wound in a first direction, a wire core member helically wound around the first skin, and an outer sheet metal skelp helically wound over the core member in a direction opposite to the winding direction of the inner skin. Preferably, the entry angles for the oppositely wound sheet metal skelp are equal, substantially, to 45°.

A preferred method for the construction of helically-formed sandwich tubing includes the steps of conforming a hollow cylindrical metal mandrel to an unstressed external radius less than a given finished tubing internal radius, radially stressing and expanding the mandrel to an external radius substantially equal to the given radius, superimposing helically-wound inner sheet metal skin, wire core, and outer sheet metal skin tubing elements, upon the mandrel, welding the tubing elements together by passing welding currents serially between a first electrode, the outer skin, the wire core, the inner skin, the mandrel, and a second electrode contacting the mandrel, contracting the mandrel to its unstressed dimensions, and removing the completed tubing from the mandrel.

While the invention is particularly pointed out in the claims appended to this specification, a better understanding thereof together with additional objects and advantages, will be had upon consideration of the following specification taken in conjunction with the accompanying drawings wherein:

Previously the approach to precisely dimensioned sandwich tubes was to construct the tubing to a convenient size near the final dimension and then to expand or reduce it to the exact dimension. The unique approach according to this invention is to construct the tubing to final dimensions and to assure concentricity by generating generally circular elements during fabrication.

Figure 1:
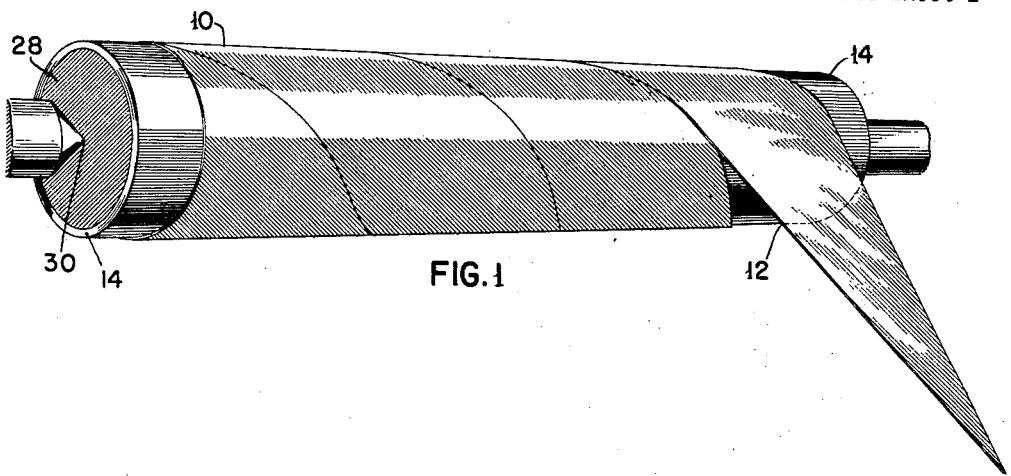
FIG. 1 illustrates formation of the inner skin of helically-formed sandwich tubing.
Figure 2:
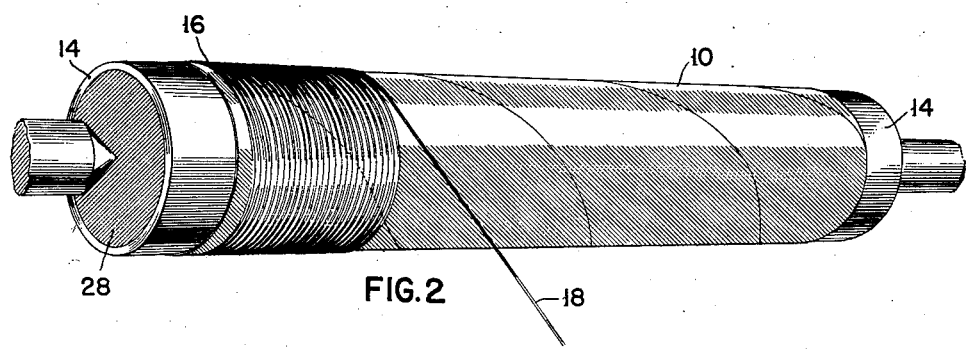
FIG. 2 illustrates winding of a wire core means upon the inner skin formed as in FIG. 1.
Figure 3:
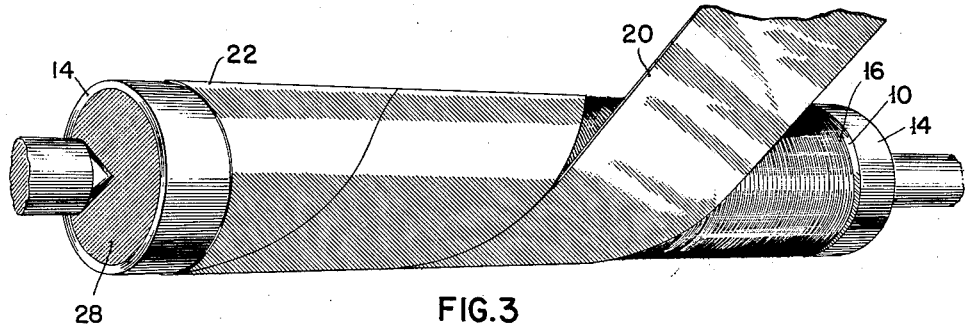
FIG. 3 illustrates formation of the outer tubing skin by counterwinding of a second sheet metal skelp.

With particular reference to FIGS. 1, 2 and 3, cylindrical sandwich tubing according to this invention comprises an inner skin 10 formed from an elongated constant-width strip or skelp 12 of sheet metal wound helically upon a mandrel 14. The abutting edges of the skelp 12 may or may not be continuously joined as by resistance welding, depending upon the prescribed pressure confining properties desired for the finished tubing. The tubular sandwich structure core, indicated generally by reference numeral 16, is thereafter formed by helically winding a wire 18 in closely spaced turns over the length of the preformed inner skin 10. The tubing is completed by winding, in the direction opposite to the first skin winding direction, a second sheet metal skelp 20 in contact with the core 16 to form outer skin 22.

The sandwich core comprises closely spaced turns of a metal wire 18 having a diameter equal to the required annular skin spacing for the completed tube. The pitch of the core wire winding 16 is the minimum necessary for tubing flexure resistance to obviate excessive contribution to tubing weight and areal density.

The relationships between helical pitch $h$, skelp width $w$ and skelp entry angle $\theta$, with respect to a generatrix of a cylinder of circumference $c$, are given by:

$$h = c \tan \theta \qquad \text{(I)}$$
$$w = c \sin \theta \qquad \text{(II)}$$

It should be realized that these relationships hold for formation of any convex cylinder—those cylinders whose directrix is a convex polygon. However, for purposes of this explanation, a circular cylinder is assumed.

Figure 4:
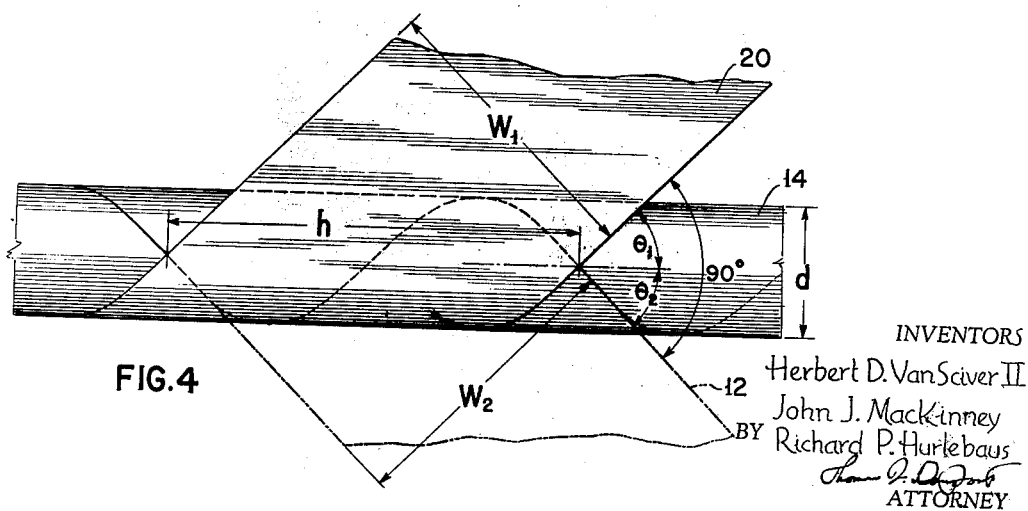
FIG. 4 illustrates geometrical relationships among the dimensions of the helically-formed sandwich tubing elements.

With reference to FIG. 4, the preferred entry angles, $\theta_1$ and $\theta_2$ respectively for inner and outer skelps 12 and 20, are substantially equal to 45° and it follows that a particular design ratio is prescribed for the skelps according to Equations I and II as:

$$w/d = \pi \sin \theta$$

where $d$ is the diameter of the cylinder to be formed. Therefore, for a preferred entry angle $\theta = 45°$, the design ratio is substantially $w/d = 2.22$.

The significance of prescribing 45° entry angles for both outer and inner skins is that the counterwound skelps 12 and 20 must then cross each other at right angles. This condition results in mutual cancellation of forming-stress produced springback dimensional variations and is a major factor assuring dimensional stability for the completed tubing.

Figure 5:
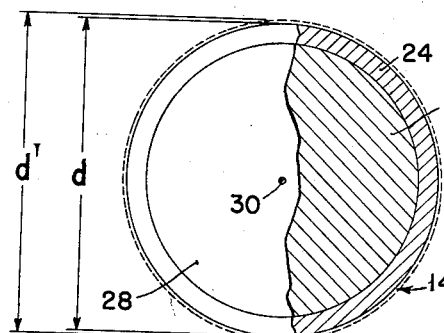
FIG. 5 is an illustration of a preferred mandrel construction according to this invention.

FIG. 5 illustrates particulars of dual function mandrel 14 according to this invention. A metal cylinder 24, preferably of a high electrical conductivity material such as a copper alloy, is substantially radially expanded to an outer diameter $d'$ greater than the desired tubing inner diameter $d$, machined to the desired tubing diameter $d$, and maintained in its stressed condition during tubing formation. Prestressing of the mandrel is accomplished conveniently by filling the mandrel with a low melting point molten material 26 which expands upon cooling. Commercial compounds such as "Cerrobend" or the like may be used for this purpose. The ends of the mandrel may be stabilized by tapered plugs 28 having defined rotational centers 30 so that the mandrel may be rotated conveniently by lathe-type apparatus. After completion of the helically-wound sandwich tubing, the mandrel stressing material 26 is melted or bored out. This allows the mandrel cylinder 24 to contract substantially after which the tubing may be removed without damage. This unique feature is a practical necessity for the successful completion of thin skinned tubings.

Figure 6:
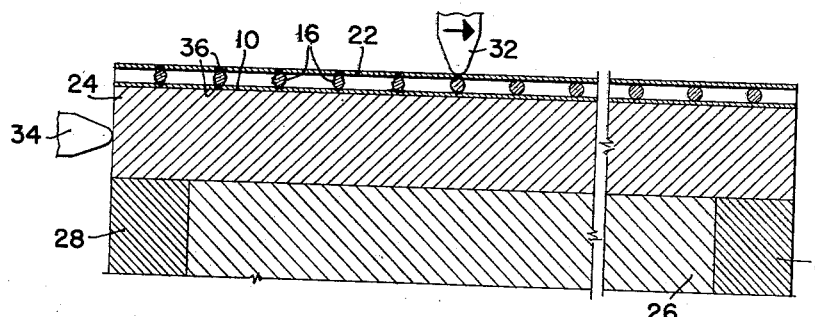
FIG. 6 illustrates, in exaggerated cross-section, the preferred welding step for integrating the helically-formed sandwich structure elements.

In the magnified sectional illustration of FIG. 6, roller welding electrodes 32 and 34 are shown respectively contacting outer skin 22 and mandrel cylinder 24. After initial tack-weld fastening, the mandrel and tubing assembly is rotated and electrode 32 is translated longitudinally of the tubing elements to remain superimposed upon the faying positions between outer skin 22, wire core 16, and inner skin 10. Intermittently timed welding pulses correlated with this relative electrode motion provide an array of helically spaced stabilizing welds 36, each being essentially a series weld along a radial line to form a fusion bond both between the outer skin and core and also between the core and inner skin. Therefore, the mandrel uniquely functions as both forming mandrel and welding mandrel according to teachings of this invention.

Figure 7:
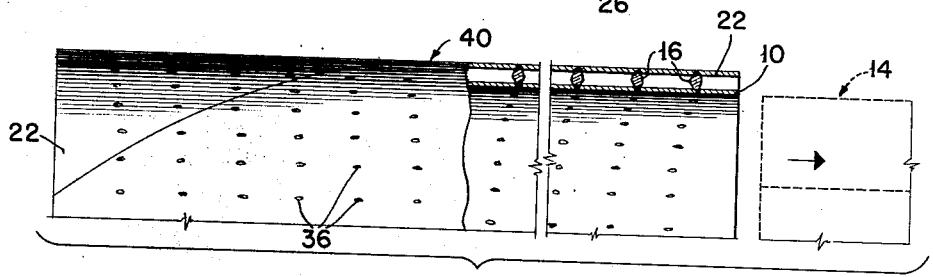
FIG. 7 is an illustration, partially broken away of the completed sandwich tubing as it is removed from the mandrel.

The completed helically-formed sandwich tubing 40 is illustrated in FIG. 7 after removal from contracted mandrel 14. The structure is rigid and uniformly concentric; it has optimum flexure properties due to the relatively high moment of inertia provided by the spaced skins; and it has minimum areal density due to the unique distribution of structural core material. The helically-formed tubing of this invention represents significant improvements in each of these properties.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Helically-formed sandwich tubing comprising a first sheet metal skelp helically wound in a first direction forming an inner skin, a continuous metal wire core member helically wound upon said inner skin, a second sheet metal skelp helically wound upon said core in the direction opposite to the winding direction of said first skelp forming an outer skin, and an array of radial series welds each integrally attaching said skins and said core member together.

2. The sandwich tubing of claim 1 in which the entry angle of each of said oppositely wound sheet metal skelps is equal substantially to 45°.

3. The sandwich tubing of claim 2 in which the width $w$ of each said skelp and the circumference $c$ of the respective skin formed thereby is predetermined substantially as:

$$w = c \sin 45°$$

References Cited in the file of this patent

UNITED STATES PATENTS

| | | |
|---|---|---|
| 1,763,360 | Kean | June 10, 1930 |
| 2,253,093 | Raichle | Aug. 19, 1941 |
| 2,402,039 | Goldman | June 11, 1946 |
| 2,402,040 | Goldman | June 11, 1946 |
| 2,635,330 | Fentress | Apr. 21, 1953 |
| 2,776,360 | Evert | Jan. 1, 1957 |
| 2,819,379 | Wiley | Jan. 7, 1958 |

FOREIGN PATENTS

| | | |
|---|---|---|
| 725,614 | Great Britain | Mar. 9, 1955 |

UNITED STATES PATENT OFFICE
CERTIFICATE OF CORRECTION

Patent No. 3,131,726                                    May 5, 1964

Herbert D. Van Sciver II, et al.

It is hereby certified that error appears in the above numbered patent requiring correction and that the said Letters Patent should read as corrected below.

Column 2, line 34, for "$h=c \tan\theta$" read -- $h=c \cot\theta$ --; line 35, for "$w=c \sin\theta$" read -- $w=c \cos\theta$ --; same column 2, line 46, for "$w/d=\pi \sin\theta$" read -- $w/d=\pi \cos\theta$ --; column 4, line 22, for "$w=c \sin 45°$" read -- $w=c \cos 45°$ --.

Signed and sealed this 20th day of April 1965.

(SEAL)
Attest:

ERNEST W. SWIDER                                    EDWARD J. BRENNER
Attesting Officer                                         Commissioner of Patents